United States Patent [19]
Koura

[11] Patent Number: 5,535,379
[45] Date of Patent: Jul. 9, 1996

[54] TIMER APPARATUS CAPABLE OF WRITING IDENTICAL DATA TO A PLURALITY OF TIMERS BUILT IN A MICROCOMPUTER

[75] Inventor: Masato Koura, Itami, Japan

[73] Assignee: Mitsubishi Denki Kabushiki Kaisha, Tokyo, Japan

[21] Appl. No.: 289,449

[22] Filed: Aug. 12, 1994

[30] Foreign Application Priority Data

Aug. 23, 1993 [JP] Japan .................. 5-207782

[51] Int. Cl.[6] ................................. H03K 21/02
[52] U.S. Cl. .................. 395/550; 377/20; 377/52; 377/107; 364/934; 364/934.3; 364/DIG. 2
[58] Field of Search .................. 364/DIG. 1, DIG. 2, 364/270; 395/550; 377/44, 52, 15; 327/286, 261

[56] References Cited

U.S. PATENT DOCUMENTS

| | | | |
|---|---|---|---|
| 3,728,635 | 4/1973 | Eisenberg | 328/55 |
| 4,161,787 | 7/1979 | Groves et al. | 364/900 |
| 4,239,982 | 12/1980 | Smith et al. | 327/142 |
| 4,538,272 | 8/1985 | Edwards et al. | 371/61 |
| 4,560,939 | 12/1985 | DeKarske et al. | 327/145 |
| 4,707,142 | 11/1987 | Baker et al. | 368/46 |
| 4,715,050 | 12/1987 | Tanaka et al. | 375/111 |
| 4,837,521 | 6/1989 | Herlein et al. | 328/72 |
| 5,012,435 | 4/1991 | Bailey et al. | 364/569 |
| 5,046,035 | 9/1991 | Jigour et al. | 364/716 |
| 5,081,297 | 1/1992 | Lebel et al. | 395/325 |
| 5,181,231 | 1/1993 | Paprikh et al. | 377/26 |
| 5,199,052 | 3/1993 | Fujita | 395/550 |
| 5,231,389 | 7/1993 | Yamauchi | 345/213 |
| 5,233,638 | 8/1993 | Moriwaki et al. | 377/55 |
| 5,377,346 | 12/1994 | Williams | 395/550 |
| 5,383,230 | 1/1995 | Fuse et al. | 377/44 |
| 5,388,100 | 2/1995 | Ohtsuka | 370/95.1 |
| 5,404,363 | 4/1995 | Krause et al. | 371/61 |

OTHER PUBLICATIONS

"8254 Programmable Interval Timer", Intel Microcomptuer Company, *Peripherals*, 1990, pp. 3–62 to 3–82.

Primary Examiner—Kevin A. Kriess
Assistant Examiner—Lucien Toplu
Attorney, Agent, or Firm—Lowe, Price, LeBlanc & Becker

[57] ABSTRACT

A timer apparatus which is provided with a control circuit 80, annexed to each of timers 1-1, 1-2 and 1-3 generating a control signal making the register 3 write data outputted from a CPU 50 when both a write signal 5 generated by the CPU 50 for writing data into the registers 3, and a timer single write signal 11 for specifying any of the timers, are generated, and furthermore is provided with a selection circuit 70 making each control circuit 80 generate a control signal when both the write signal 5 and a timer grouping signal 14 generated for specifying each of the plurality of timers 1-1, 1-2 and 1-3, are generated. When it is necessary that identical data be held in the respective registers 3 of the plurality of timers 1-1, 1-2 and 1-3, the identical data can be written into each of the registers 3 at the same time.

7 Claims, 12 Drawing Sheets

TIMER APPARATUS CAPABLE OF WRITING IDENTICAL DATA TO A PLURALITY OF TIMERS BUILT IN A MICROCOMPUTER

BACKGROUND OF THE INVENTION

1. Field of the Invention

The present invention relates to a timer apparatus for a microcomputer, more specifically, it relates to a timer apparatus composed of a timer and its accompanying circuits, which are built, in a single-chip microcomputer and can be employed for controlling time events thereof.

2. Description of the Related Art

Referring to a block diagram of FIG. 1, an outlining explanation will be made concerning the conventional fundamental configuration of an individual timer built in a single-chip microcomputer.

In FIG. 1, reference symbol 1 indicates a timer. This timer 1 is built in a single-chip microcomputer, and as one of its peripheral circuits, it is used for controlling time events of the single-chip microcomputer.

The timer 1 is mainly composed of a counter 2 and a register 3.

The counter 2 executes a counting operation, with a clock signal CLK as a count source generated in the single-chip microcomputer in which the timer 1 is built in.

Data DATA (refer to FIG. 3) is supplied to the register 3 via a bus from a CPU of the single-chip microcomputer in which the timer 1 is built in. Then, at the time point when a register write signal W is supplied from the CPU, the register 3 takes in and holds the data DATA outputted from the CPU to the bus.

According to the data held in the register 3 as mentioned above, the timer 1 consequently causes the counter 2 to perform counting operation of the clock CLK, and accordingly carries out various counting operations. For example, when a load signal LOAD is supplied from the CPU to the counter 2, data held in the register 3 is set as the initial value in the counter 2. From the initial value thus set, with the clock signal CLK as a count source, the counter 2 starts a counting down from that time point onward, and when the count value becomes "0," an underflow signal UF is outputted. Then, through the output of this underflow signal UF from the counter 2, the CPU executes, for example, a predetermined interrupt processing, or peripheral circuits not illustrated are made to carry out various processings.

An external input signal indicated by the reference symbol EXIN is likewise supplied to the timer 1. Operations of the timer 1 are controlled, also by the external input signal EXIN supplied from the outside of the single-chip microcomputer in which the timer 1 is built in. By changing over the count source of the counter 2 to the external input signal EXIN which is a clock, replacing the ordinary single-chip microcomputer internal clock signal CLK, for example, it becomes possible for the single-chip microcomputer to perform non-routine operations.

Next, referring to the circuit diagram of FIG. 2, explanation will be made on a conventional circuit configuration for accessing the register 3 of the timer 1 so as to write data.

There are two kinds of access to the register 3, data write access for writing and holding data in the register 3, and data read access for reading out data held in the register 3, and since data write access is the object of the present invention, data read access will be omitted.

In FIG. 2, reference symbol 8 indicates a dual-input AND gate. To one of its input terminals a write signal 5, and to the other input terminal an "i"th-timer register address decoding signal 7, are inputted respectively. Consequently, when both input signals 5 and 7 are "1" in common, the AND gate 8 outputs a signal "1". The output signal of the AND gate 8 is supplied as an "i"th timer register write signal 9 to the register 3 of the timer 1. This "i"th timer register write signal 9 is the aforementioned register write signal W indicated in FIG. 1.

Suppose that within an ordinary single-chip microcomputer, a plurality of equivalents to the aforementioned timer 1 are provided. Now, for example, i (i=1, 2 ... n) is assumed to be a number which specifies n number of individual timers 1 respectively, then the "i"th timer register address decoding signal 7 is assumed to be a signal which specifies the respective timers 1 ("i"th timer 1-i), and the write signal 5 is a signal for writing data into any of the registers 3 of the timers 1.

Consequently, in the case where the write signal 5 is active ("1"), since only from the AND gate 8 in which the "i"th timer register address decoding signal 7 has become active ("1"), the "i"th register write signal 9 is outputted, data is written into the register 3 only of the "i"th timer 1-i.

As mentioned above, an individual timer apparatus is composed of the circuit shown in FIG. 2 and the timer 1 shown in FIG. 1, and usually a plurality of such timer apparatus are built in the general single-chip microcomputer.

A block diagram of FIG. 3 shows an example of configuration of a case in which a plurality, for example, three first through third timers 1-1, 1-2 and 1-3 are built in such a conventional single-chip microcomputer.

In FIG. 3, reference symbols 50, 51 and 52 indicate, respectively, a CPU of the single-chip microcomputer, an address decoder, and an address bus which interconnects them, for sending an address signal ADD from the CPU 50 to the address decoder 51.

AND gates 8-1, 8-2 and 8-3, corresponding to reference symbol 8 of FIG. 2, have outputs respectively connected to each timer 1-1, 1-2 and 1-3.

Timer register address decoding signals 7-1, 7-2 and 7-3 from the address decoder 51 are respectively connected to one of the inputs of the respective AND gates 8-1, 8-2 and 8-3, and to the other, write signal 5 from the CPU 50 is connected in common.

Moreover, the respective registers 3 of the timers 1-1, 1-2 and 1-3 are connected with the CPU 50 through a data bus 53.

In such a configuration, an operation for specifying one among timers 1-1, 1-2 and 1-3 and writing data into its register 3 will be as follows.

The address signal ADD which specifies any of the timers 1-1, 1-2 and 1-3 is outputted from the CPU 50 to the address bus 52. For instance, in the present example shown in FIG. 3, the 2-bit address signal ADD is outputted from the CPU 50 to the address bus 52 and is inputted into the address decoder 51. Address decoder 51 decodes the address signal ADD supplied from the CPU 50 and converts to "1" only one among "i"th timer register address decoding signal 7-1, 7-2 and 7-3.

Furthermore, the CPU 50 changes the write signal 5 to "1", and simultaneously outputs to the data bus 53 data DATA to be written into the register 3.

Accordingly, only the "i"th timer register write signal 9-1 (or 9-2, or 9-3) becomes "1", which is the output from the AND gate 8-1 (or 8-2, or 8-3) to whose one input of the "i"th timer register address decoding signal 7-1 (or 7-2, 7-3) of "1" has been supplied. Consequently, data DATA from the data bus 53 is inputted and written into the register 3 of the first timer 1-1 (or second timer 1-2, or third timer 1-3), into which the "i"th timer register write signal 9-1 (or 9-2, or 9-3) of "1" is inputted.

In a conventional single-chip microcomputer which built in such timers, when the CPU writes data into the respective registers of a plurality of the built-in timers, the individual timers into which data must be written are specified one by one according to the address decoding signal, and writes the data only into the specified timer register. Consequently, when it is necessary to write identical data into the plurality of timer registers, it is necessary for the CPU to reiterate a process which writes identical data into the respective registers while successively specifying each timer. When there is no time margin in the program which is executed by the microcomputer, however, a situation arises in which the process of writing data into the timer does not catch up with the program execution speed.

The interrupt processing which is carried out at the time of a generation of an interrupt in the single-chip microcomputer, for instance, can be given as a concrete example of a situation as aforementioned. The process, which entails a generation of the interrupt and writing of data into the plurality of timer registers, is executed according to an interrupt operation which is separate from the main routine process of the single-chip microcomputer, but there is concern that the successive writing of data into the plurality of timer registers might become impossible due to the time aspect, since lack of a time margin in the main routine would cause a time control restriction to be imposed on the interrupt process.

For example, with the aforementioned configuration shown in FIG. 3, even when a time margin exists for the CPU to write data either into the individual timer registers, or into two timer registers among the three timers, there is a possibility that there is not sufficient time for the CPU to write data into every one of the registers of the three timers.

Moreover, when it is necessary to control the plurality of timers likewise with the external input signal, it becomes necessary to input the external input signal to the plurality of timers in the same manner, but herein, also owing to the time aspect, there is the concern that control would prove difficult.

SUMMARY OF THE INVENTION

Having had to take the foregoing circumstances into consideration, wherein it is necessary that identical data be held in respective registers of a plurality of timers built, in a microcomputer, it is a principal object of the present invention to provide a timer apparatus capable of simultaneously writing identical data into respective registers of a plurality of timers.

Furthermore, it is also an object to provide a timer apparatus capable of inputting to all of the timers an external input clock supplied to one timer when an external input clock can be inputted to each of such timers.

In a timer apparatus related to the present invention, a control circuit which generates a control signal effecting writing into the registers of data output ted from the CPU is provided annexed to each of the timers in case a first signal, generated by the CPU for specifying writing of data into each timer register, and a second signal, generated by the CPU for specifying any among the plurality of timers, are inputted, and both the first signal and the second signal having generated together. In addition, selection circuits are provided for each of the control circuits, in which control signals are generated in case the first signal, and a third signal having been specifying the entire plurality of timers, are inputted, and both the first signal and the third signal having been generated.

Also provided in a timer apparatus related to the present invention are selecting means for selecting an external clock which is inputted to one among the plurality of timers, and controlling means for inputting as the external clock to all of the plurality of timers the external clock selected by the selecting means.

In a timer apparatus related to the invention, a control circuit, which is provided to each of the timers, generates a control signal making a register write data when both of the any one of the timers writes the data from the CPU, and a control circuit, which inputs the first signal and a third signal, makes each control circuit generate a control signal when both of the first signal and the third signal are generated, thereby identical data from the CPU is made written into registers of all the timers.

Moreover, in a timer apparatus related to the present invention, by the selecting means an external clock which is inputted to one among the plurality of timers is selected, and the selected external clock is inputted to all of the plurality of timers through the controlling means.

The above and further objects and features of the invention will more fully be apparent from the following detailed description with accompanying drawings.

DESCRIPTION OF THE PREFERRED EMBODIMENTS

Figure 1:
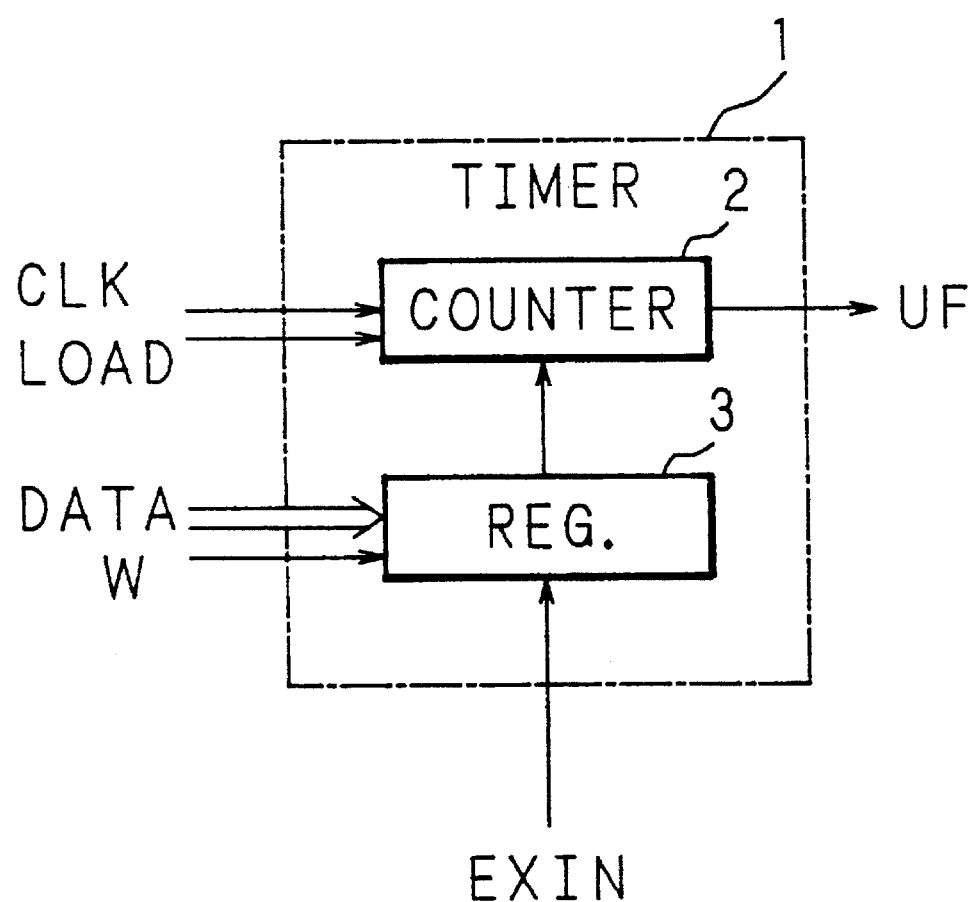
FIG. 1 is a block diagram showing a conventional basic configuration of an individual timer built in a single-chip microcomputer.

In the following, a detailed explanation will be made on the invention referring to the drawings showing the embodiments thereof.

Figure 4:
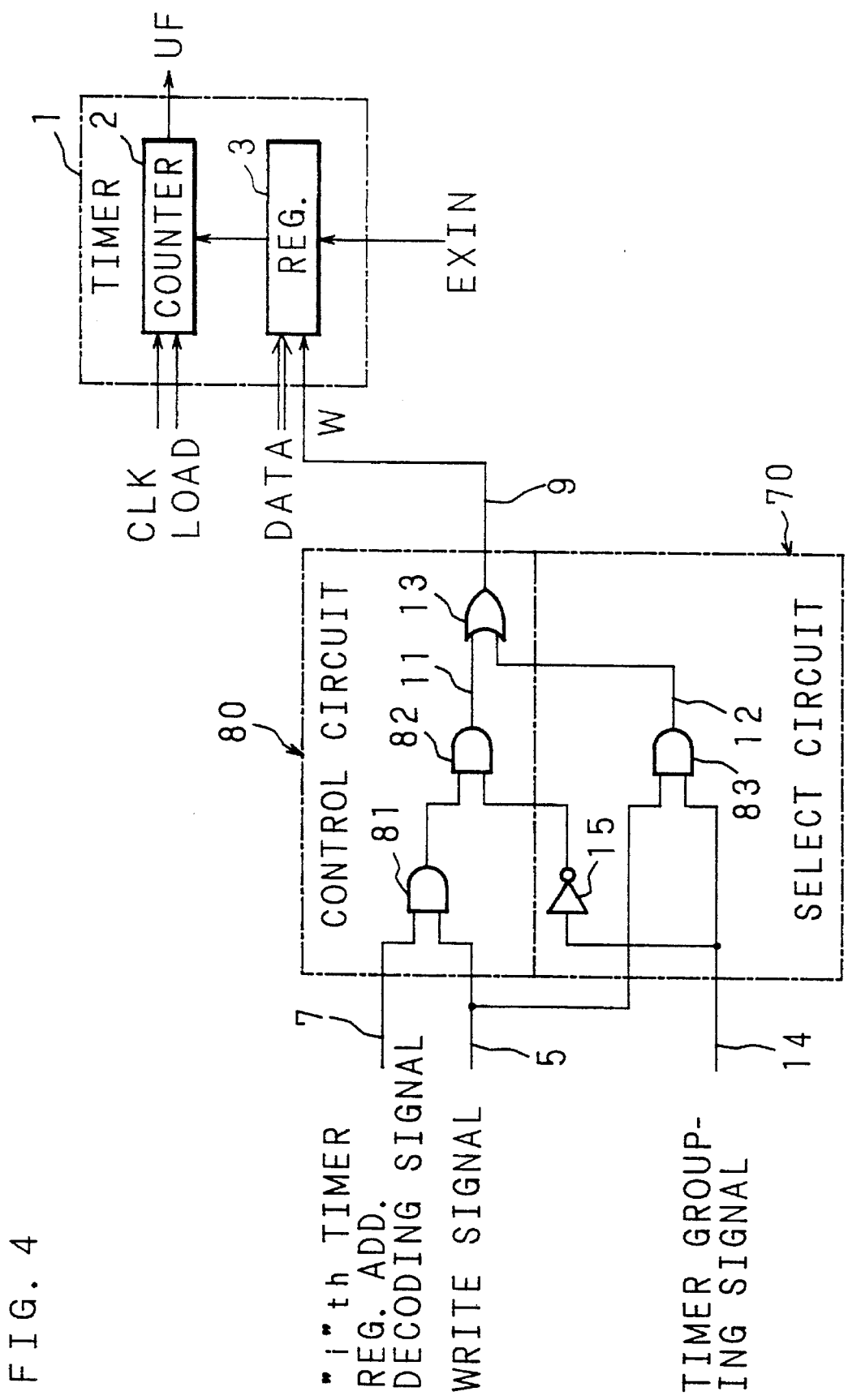
FIG. 4 is a circuit diagram showing a configuration of a first embodiment of a timer apparatus of the present invention.

FIG. 4 is a circuit diagram which shows the configuration of a timer apparatus, i.e., both the timer and its annexed circuits, relating to the first embodiment of the present invention, concretely, a circuit configuration for accessing a timer register and writing data into the register.

Figure 2:
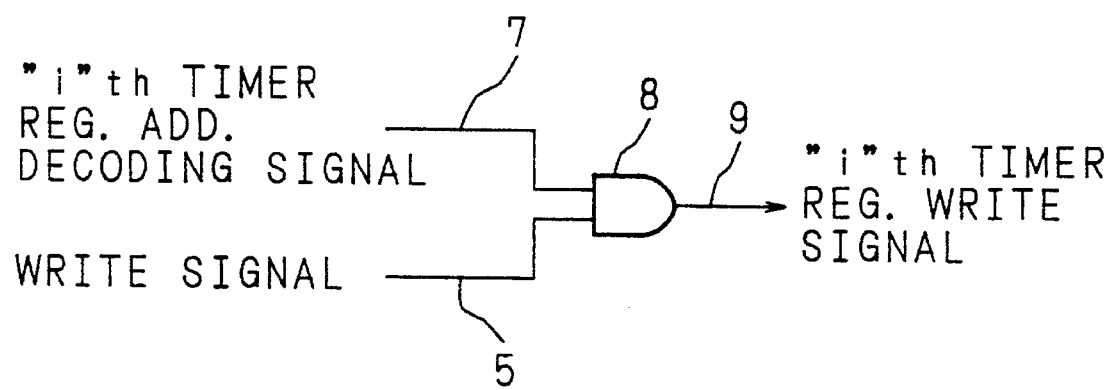
FIG. 2 is a circuit diagram showing a conventional configuration of a circuit for writing data by accessing a register of a timer.
Figure 3:
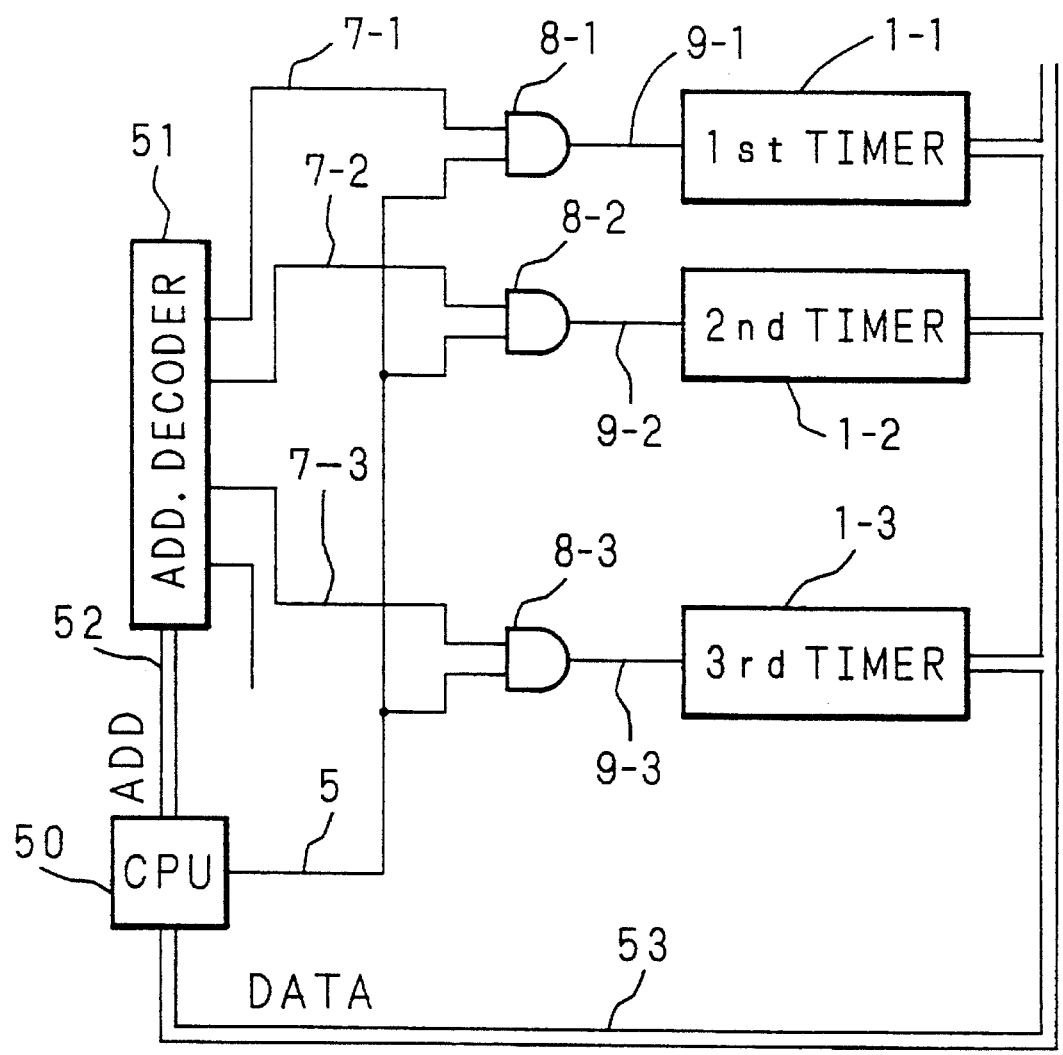
FIG. 3 is a block diagram showing an example of one configuration of the case in which a plurality of timers are built in a conventional single-chip microcomputer.

Meanwhile, in the first embodiment, thus shown in FIG. 4, reference symbols identical with those in the referred FIG. 1, FIG. 2 and FIG. 3 in the foregoing explanation of the conventional examples show the same or corresponding parts.

In FIG. 4, reference symbol 1 indicates a timer. The timer 1 is built in a single-chip microcomputer, and as one of its peripheral circuits, it is used for controlling time events of the single-chip microcomputer.

The timer 1 is composed mainly of a counter 2 and a register 3.

With a clock signal CLK generated within the single-chip microcomputer built in the timer 1 as a count source, the counter 2 executes counting.

From a CPU (refer to FIG. 5) of the single-chip microcomputer built in the timer 1, data DATA is supplied via a bus to the register 3. At the time point when a register write signal W likewise is supplied from the CPU, the register 3 takes in and holds data DATA being outputted from the CPU to the bus.

The timer 1 carries out various counting operations by making the counter 2 perform counting of the clock signal CLK in conformity with data held as above-mentioned in the register 3. For example, when a load signal LOAD is supplied from the CPU to the counter 2, the data held in the register 3 is set as the initial value in the counter 2. The counter 2, from the initial value set as such, with the clock signal CLK as a clock source, starts counting down from that time point onward, and outputs an underflow signal UF when the count value becomes "0". Then, for example, the CPU executes a predetermined interrupt processing or, in peripheral circuits not illustrated, various processings are executed, by that the underflow signal UF is outputted from the counter 2.

Moreover, an external input signal indicated by the reference symbol EXIN is also supplied to the timer 1. The operations of the timer 1 are controlled also by means of this external input signal EXIN supplied from the exterior of the single-chip microcomputer built in the timer 1. By changing over the counter 2 count source to the external input signal EXIN, which is the clock, replacing the internal clock signal CLK of the ordinary single-chip microcomputer, for example, it becomes possible for the single-chip microcomputer to execute performance of non-routine operations.

The configuration itself of the timer 1 as aforementioned is similar to that of the conventional timer 1 shown in the afore-mentioned FIG. 1.

Explanation will further be made on a circuit configuration for accessing register 3 of the timer 1 in the first embodiment of the timer apparatus of the present invention and writing data.

In FIG. 4, reference symbol 81 indicates a dual-input AND gate. To the one of its input terminals a write signal 5, and to the other input terminal an "i"th timer register address decoding signal 7, are inputted respectively. Consequently, when both input signals 5 and 7 are "1" in common, the AND gate 81 outputs the signal "1", and the output signal of the AND gate 81 is supplied to one of the input terminals of the dual-input AND gate 82.

A high-level active timer grouping signal 14 is supplied through an inverter 15 to the other input terminal of the AND gate 82. Consequently, because the AND gate 82 outputs a signal "1" when both input signals are "1" in common, it outputs a signal "1" when the output signal of the AND gate 81 is "1" and besides the timer grouping signal 14 is non-active ("0").

The output signal of the AND gate 82 is supplied as an "i"th timer single write signal 11 to one of the input terminals of an OR gate 13 of dual-input.

Reference symbol 83 indicates a dual-input AND gate. The above-mentioned timer grouping signal 14 is supplied directly to one of its input terminals, and the write signal 5 is supplied to the other input terminal. Consequently, because the AND gate 83 outputs a signal "1" when both input signals are "1", it outputs a signal "1" when the timer grouping signal 14 is active ("1") and the write signal 5 is active besides.

The output signal of the AND gate 83 is supplied as an "i"th timer grouping write signal 12 to the other input terminal of the foregoing OR gate 13.

The "i"th timer single write signal 11, which is the output signal of the AND gate 82, and the "i"th timer grouping write signal 12, which is the output signal of the AND gate 83, are inputted to the OR gate 13 as aforementioned and when either one of these inputs is "1", the output signal of the OR gate 13 becomes "1". The output signal of the OR gate 13 is supplied to the "i"th timer 1-i as an "i"th timer register write signal 9. This "i"th timer register write signal 9 is the write signal W (5).

Likewise as with the conventional example, the "i"th timer single write signal 11 is a write signal for writing data separately into the individual timer registers 3. Widen the write signal 5 is "1", the "i"th timer register address decoding signal 7 is "1", and the timer grouping signal 14 is "0", the "i"th timer single write signal 11 is outputted from the AND gate 82 as an output signal "1", and is inputted by way of the OR gate 13 to the "i"th timer 1-i.

On the other hand, the "i"th timer grouping write signal 12 is a write signal for writing data simultaneously into the plurality of timer registers 3, being different from the conventional example. When the write signal 5 is "1", and the timer grouping signal 14 is "1", the "i"th timer grouping write signal 12 is outputted from the AND gate 83 as an output signal "1", and is inputted by way of the OR gate 13 to the "i"th timer 1-i.

For the sake of brevity of description, explanation was made on a single timer 1 in the configuration example shown in FIG. 4 as aforementioned, however, a plurality of timers 1 are usually built in the ordinary single-chip microcomputer. Thus, for the plurality of timers 1, the delimited section indicated by reference symbol 80 in FIG. 4 (called a control circuit below), i.e., the circuit composed of the AND gates 81 and 82 as well as the OR gate 13, is annexed to the individual timers 1, and for only one of the timers 1, one delimited section indicated by the other reference symbol 70 (called a selection circuit below), i.e., the circuit composed of the AND gate 83 and the inverter 15, is provided.

Figure 5:
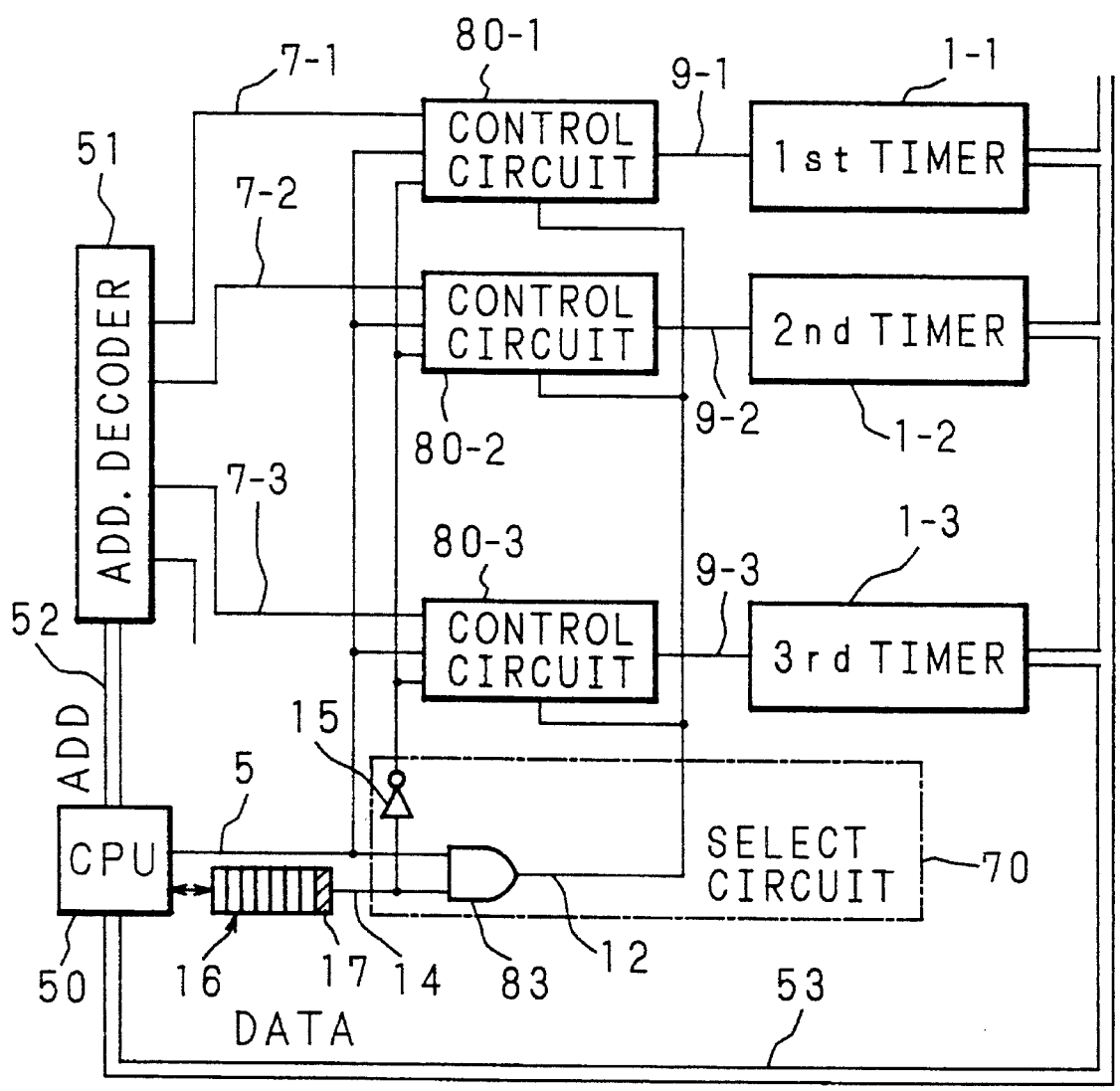
FIG. 5 is a block diagram showing an example of one configuration of a timer apparatus of the present invention of the case in which a plurality of timers are built in a single-chip microcomputer.

FIG. 5 is a block diagram which shows an example of a configuration of a timer apparatus of the present invention wherein a plurality of timers are built in such a general single-chip microcomputer, for example, three first through third timers 1-1, 1-2 and 1-3 of identical configuration with the timers 1 shown in FIG. 4 are built in.

In FIG. 5, reference symbols 50, 51 and 52 indicate, respectively, a CPU of the single-chip microcomputer, an address decoder, and an address bus for sending an address signal ADD from the CPU 50 to the address decoder 51.

In the single-chip microcomputer building in the timer apparatus of the invention, timer grouping register 16 of 8-bit format, as an example, is further provided, and one specific bit (called a timer grouping bit below) 17 among the 8 bits is used for selection of whether to specify an individual timer, or to specify all of the timers.

Concretely, when "0" is set in the timer grouping bit 17 of timer grouping register 16, an individual timer is specified to serve in a single write mode, and when "1" is set, all the timers are specified simultaneously as a grouping write mode.

Respective output signals 9-1, 9-2 and 9-3 from the control circuits 80-1, 80-2 and 80-3, which correspond to the reference symbol 80 in FIG. 4, are connected to respective timers 1-1, 1-2 and 1-3.

Connected to a first input among four inputs of each of the control circuits 80-1, 80-2 and 80-3 is each of "i"th timer register address decoding signals 7-1, 7-2 and 7-3 from the address decoder 51. The value which is set to the timer grouping bit 17 of the timer grouping register 16, after being outputted as the timer grouping signal 14, is inverted by an inverter 15 of the selection circuit 70 and is connected in common to second inputs. A write signal 5 from the CPU 50 is connected in common to the third inputs, and an "i"th timer grouping write signal 12, which is the output from the AND gate 83 of the selection circuit 70, is connected in common to fourth inputs.

The write signal 5 outputted from the CPU 50 as well as the timer grouping signal 14 outputted from the timer grouping register 16 are inputted, just as has been shown in the aforementioned FIG. 4, to the AND gate 83 of the selection circuit 70.

Furthermore, a register 3 of each of the timers 1-1, 1-2 and 1-3 is connected with the CPU 50 through the data bus 53.

In such a configuration, when operation is made in a single write mode in which "0" has been set in the timer grouping bit 17 of the timer grouping register 16, i.e., an operation in case of specifying one among the timers 1-1, 1-2 and 1-3 and writing data into its register 3, will be as below.

Herein, the value "0" set in the timer grouping bit 17 of the timer grouping register 16 is outputted as the timer grouping signal 14, and is inverse-outputted by the inverter 15. The output "1" of the inverter 15 is inputted to the AND gates 82 of each of the control circuits 80-1, 80-2 and 80-3.

The address signal ADD which specifies any of the timers 1-1, 1-2 or 1-3 is outputted from the CPU 50 to the address bus 52. For instance, in the example shown in FIG. 5, the 2-bit address signal ADD is outputted from the CPU 50 to the address bus 52 and inputted to the address decoder 51. The address decoder 51 decodes the address signal ADD supplied from the CPU 50 to make only one of the "i"th timer register address decoding signals 7-1, 7-2 or 7-3 becomes "1".

Also, the CPU 50 at the same time converts the write signal 5 to "1", and outputs to the data bus 53 the data DATA to be written into the register 3.

Accordingly, since the output of the AND gate 81 becomes "1" in the control circuit 80-1 (or control circuit 80-2, 80-3) in which the "i"th timer register address decoding signal 7-1 (or 7-2, 7-3) of "1" is inputted, both inputs of the AND gate 82 become "1", and the "i"th timer single write signal 11 which is its output becomes "1". Consequently, because the "i"th timer register write signal 9-1 (or 9-2, 9-3) which is the output of the OR gate 13, i.e., the write signal W, becomes "1", data DATA is inputted from the data bus 53 and is written into the register 3 of that timer 1-1 (or 1-2, 1-3).

On the other hand, when operation is made under the single write mode in which "1" has been set in the timer grouping bit 17 of the timer grouping register 16, i.e., an operation in case of specifying all of the timers 1-1, 1-2 and 1-3 and simultaneously writing data into the respective registers 3 of respective timers, will be as below.

Herein, the value "1" set in the timer grouping bit 17 of the timer grouping register 16 is outputted as the timer grouping signal 14, and is inputted to the inverter 15 as well as to the AND gate 83.

The CPU 50 makes the write signal 5 become "1" and outputs to the data bus 53 the data DATA to be written into the register 3.

Accordingly, since the "i"th timer grouping write signal 12, which is the output of the AND gate 83, becomes "1", and is inputted to each of the control circuits 80-1, 80-2 and 80-3, the "i"th timer register write signals 9-1, 9-2 and 9-3 (the write signals W), which are the outputs of the OR gates 13 of each of the control circuits 80-1, 80-2 and 80-3, become "1". Consequently, data DATA is inputted from the data bus 53 and written into the registers 3 of all of the timers 1-1, 1-2 and 1-3.

At this time, since "0" as the output of the inverter 15 is inputted to the AND gates 82 of each of the control circuits 80-1, 80-2 and 80-3, all of the "i"th timer single write signals 11 which are their outputs become "0". Hence, each of the "i"th timer register write signals 9-1, 9-2 and 9-3, being the outputs of the OR gates 13 of each of the control circuit 80-1, 80-2 and 80-3, become "1", irrespective of whichever kind of address signal ADD the CPU 50 outputs to the address decoder 51.

In the above-mentioned first embodiment, the value of the timer grouping bit 17 of the timer grouping register 16 is outputted as the timer grouping signal 14 directly from the timer grouping register 16, yet it would also be suitable that the CPU 50 read out the value of the timer grouping bit 17, and the timer grouping signal 14 be outputted respectively. In that case, when the value of the timer grouping bit 17 is "0", it is possible that the value of the timer grouping signal 14 can be made "1".

Figure 6:
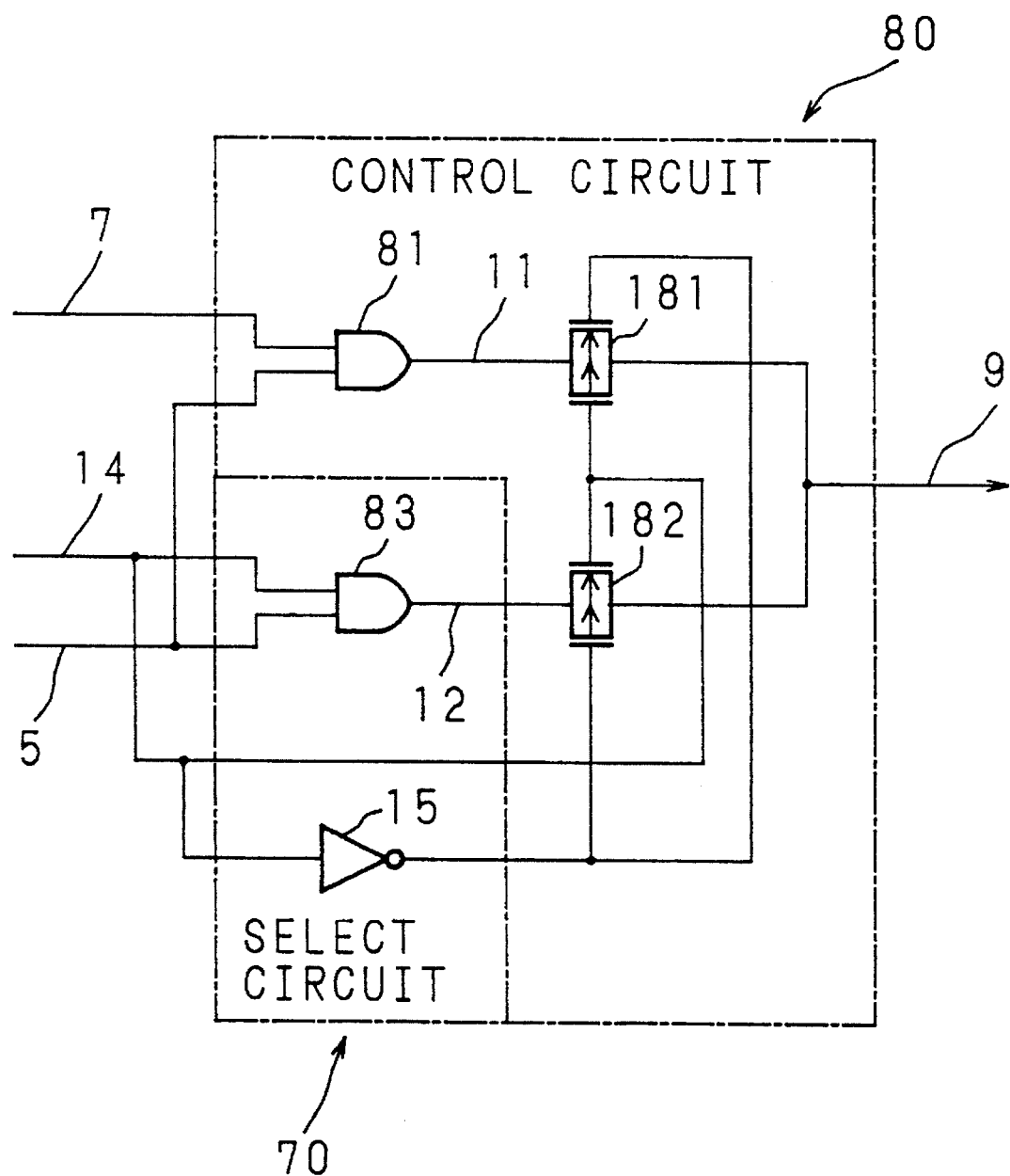
FIG. 6 is a circuit diagram showing a configuration of timer apparatus of a second embodiment, of the present invention.

FIG. 6 is a circuit diagram showing a configuration of a second embodiment of the timer apparatus of the present invention, and reference symbols which are identical with those shown in the above-mentioned FIG. 4 and FIG. 5 of the first embodiment indicate identical or corresponding parts.

In the second embodiment shown in FIG. 6, likewise as the case with the foregoing FIG. 4, only the configuration as to a single timer 1 is indicated.

In the second embodiment, the "i"th timer register address decoding signal 7 as well as the write signal 5 are inputted to the AND gate 81 of the control circuit 80, and its output is supplied as the "i"th timer single write signal 11 to a first transfer gate 181 which is composed of a P-channel transistor and an N-channel transistor.

Further, a timer grouping signal 14 as well as the write signal 5 are inputted to the AND gate 83, and its output is supplied as an "i"th timer grouping write signal 12 to a second transfer gate 182 which is composed of a P-channel transistor and an N-channel transistor.

The outputs of both the transfer gates 181 and 182 are connected, and are supplied to the registers 3 of the respective timers 1 as the "i"th timer register write signals 9.

Here, as signals for controlling of both transfer gates 181 and 182, the timer grouping signal 14 is connected intact to a gate of the P-channel transistor of the first transfer gate 181 and to a gate of the N-channel transistor of the second transfer gate 182. Furthermore, a signal which is obtained by inverting the timer grouping signal 14 by the inverter 15 is connected to a gate of the N-channel transistor of the first transfer gate 181 and also to a gate of the P-channel transistor of the second transfer gate 182.

Consequently, under the grouping write mode, since the timer grouping signal 14 becomes "1" and the output of the inverter 15 becomes "0", the "i"th timer grouping write signal 12, which is the output of the AND gate 83, is outputted as the "i"th timer register write signal 9. Moreover, under the single-write mode, since the timer grouping signal 14 and the output of the inverter 15 become, respectively, "0" and "1", the "i"th timer single write signal 11, which is the output of the AND gate 81, is outputted as the "i"th timer register write signal 9.

Needless to say, it is possible to apply the second embodiment shown in FIG. 6 to a single-chip microcomputer in which a plurality of timers 1 having a configuration likewise as shown in FIG. 5 are built in, by connecting control circuits indicated by the reference symbol 80 to individual timers 1.

The reasons for adopting a configuration of the second embodiment as mentioned above shown in FIG. 6, then, are as follows.

In the configuration of the first embodiment as shown in FIG. 5, the output of the OR gate 13 is supplied to the registers 3 of each timer 1 as the "i"th timer register write signal 9. For this reason, even when one each of the selection circuits 70 has been provided to each individual timer 1, it is necessary to provide one each of the OR gates 13 of the control circuits 80 to each timers 1.

As shown in FIG. 6, however, by connecting to each other the outputs from the transfer gates 181 and 182, which are respectively different from each other when the "i"th timer register write signal 9 is outputted by the "i"th timer single write signal 11 and when the "i"th timer register write signal 9 is outputted by the "i"th timer grouping write signal 12, it becomes possible to reduce the number of transistors, and it becomes possible to reduce the circuit area as well, because it is sufficient that there be only one transfer gate 182 of the control circuit 80 to the plurality of timers 1.

Figure 7:
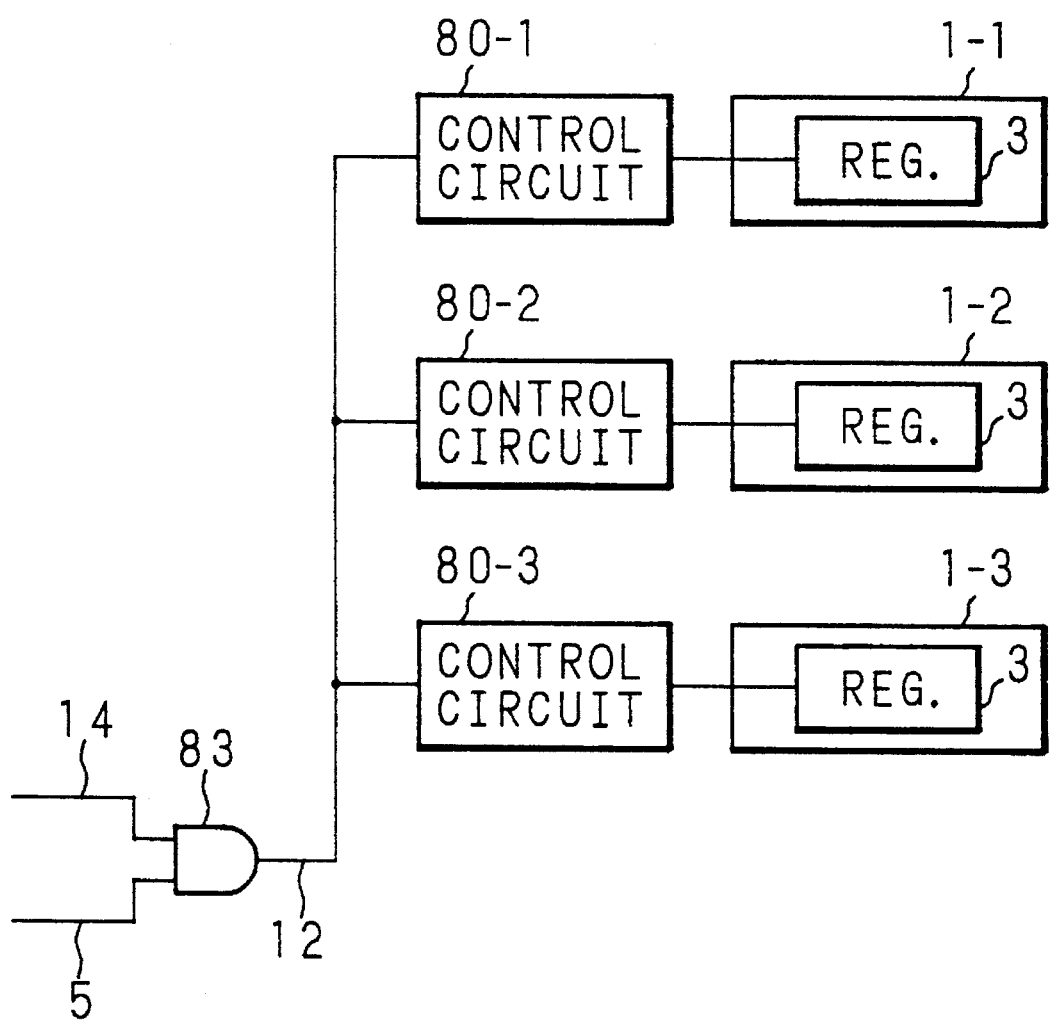
FIG. 7 is a simplified wiring diagram noting a wiring state in the timer apparatus of the present invention.

Hereupon, a wiring diagram is set forth in FIG. 7, noting the wiring state for the timer grouping write signal 12 and simplified from the configuration shown in FIG. 5. In FIG. 7, the wiring is such that, the timer grouping write signal 12 is inputted to the plurality of timers 1 successively.

Figure 8:
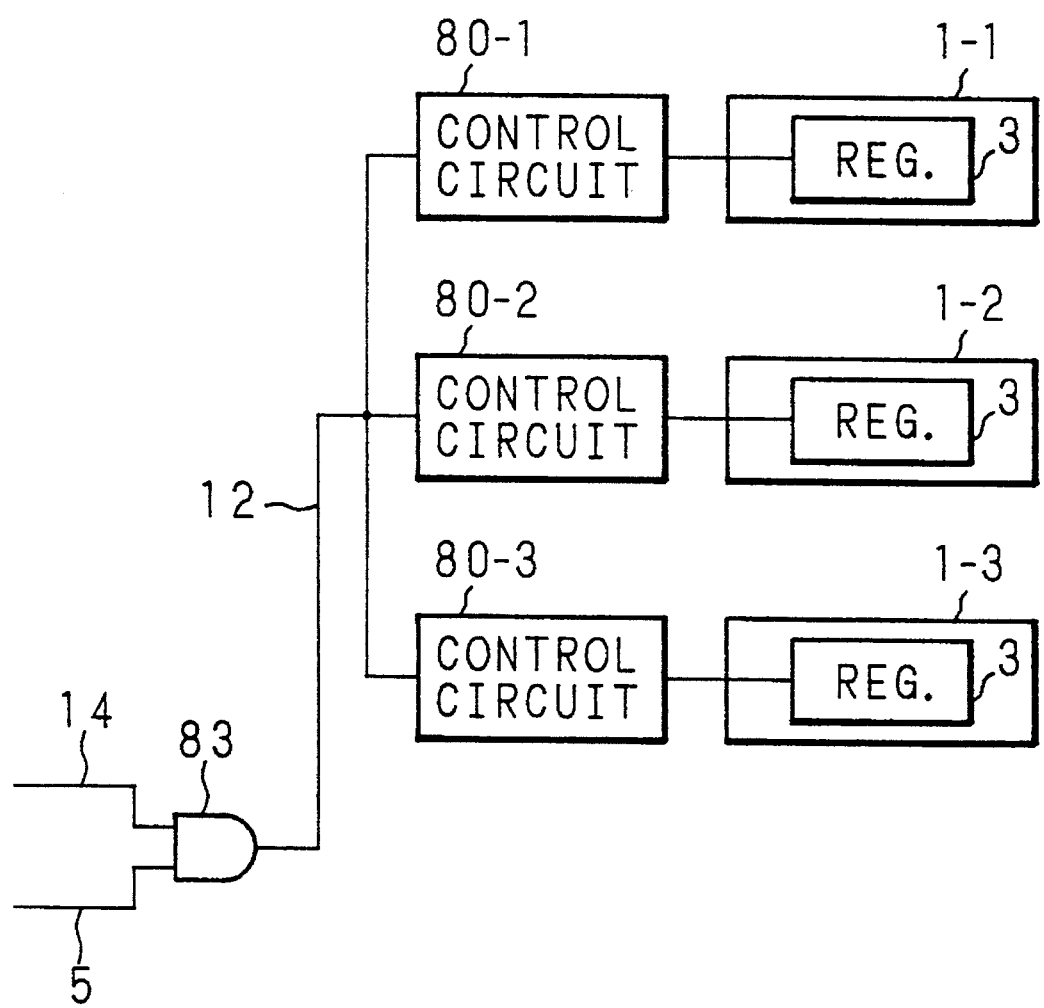
FIG. 8 is a simplified wiring diagram noting a wiring state in a conventional timer apparatus.

But, as shown in FIG. 8, for example, in the case where the wiring is such that the timer grouping write signal 12 is inputted to the plurality of timers 1-1, 1-2 and 1-3 at almost the same distance, the respective registers 3 of the timers 1-1, 1-2 and 1-3 will be accessed through the AND gate 83 at almost the same time. In such a case, because a relatively large drive capacity is required for the AND gate 83, fluctuations in electric potential are apt to occur within the single-chip microcomputer, and noise generation and erroneous operations will be brought about.

For this reason, in the timer apparatus of the present invention, a circuit equivalent to the wiring diagram simplified in FIG. 7 has been devised such that the timer grouping write signal 12 is successively inputted to each register 3 of the plurality of timers 1-1, 1-2 and 1-3.

Next, explanation will be made on a third embodiment of the present invention.

Figure 9:
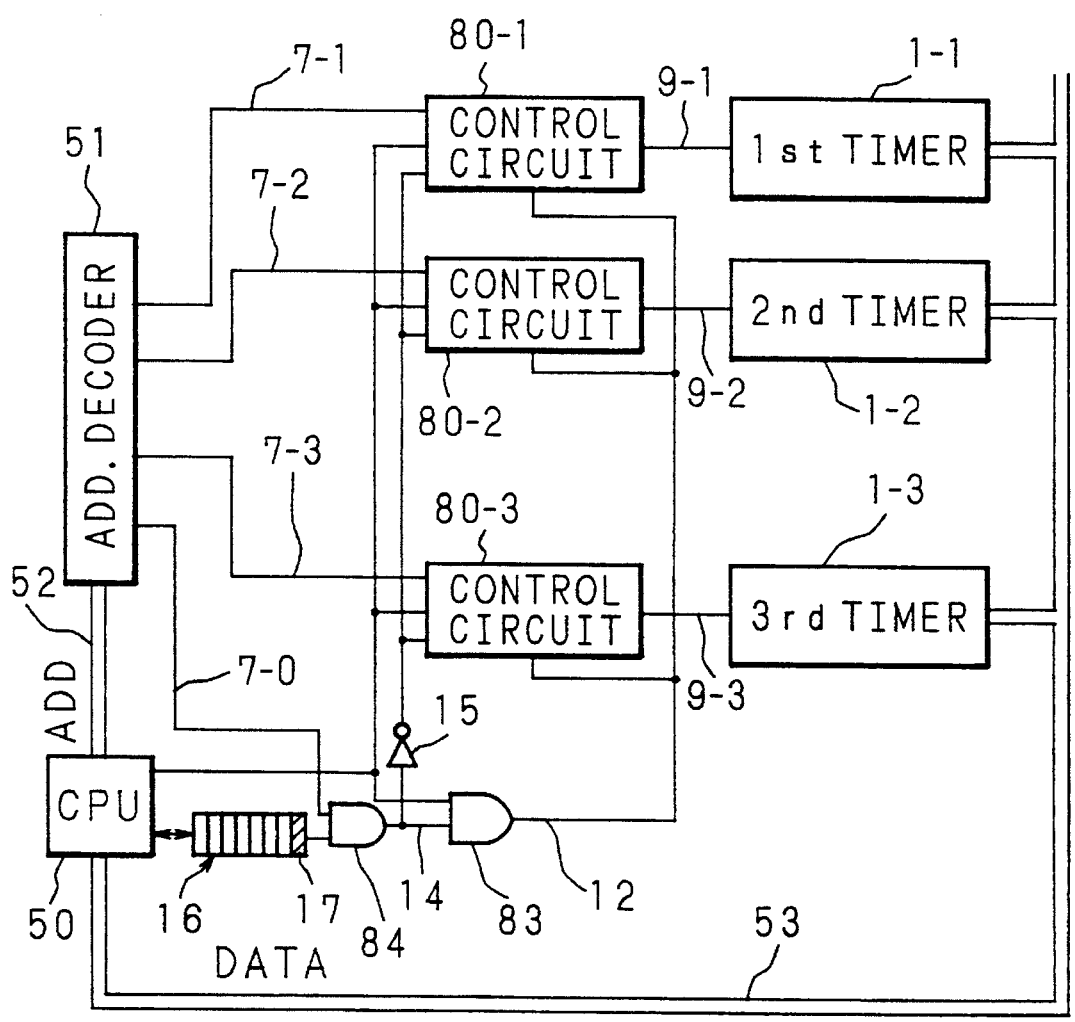
FIG. 9 is a block diagram showing a configuration of a timer apparatus of a third embodiment, of the present invention.

FIG. 9 is a block diagram which shows the configuration of a third embodiment of the timer apparatus of the present invention, and reference symbols identical with those of the aforementioned FIG. 5 indicate identical or corresponding parts.

In the third embodiment shown in FIG. 9, the configuration is such that a grouping writ mode is specified by an address, which is not allocated to each of the timers 1-1, 1-2 and 1-3, among the addresses ADD outputted from the CPU 50.

Concretely, other than the "i"th timer register address decoding signals 7-1, 7-2 and 7-3, grouping write mode signal 7-0 is outputted from the address decoder 51 and is supplied to one of the inputs of a dual-input AND gate 84. The timer grouping bit 17 of the timer grouping register 16 is connected to the other input of the AND gate 84, and when both inputs of the AND gate 84 are "1", the output of the AND gate 84 becomes "1" and is outputted as the timer grouping signal 14 to the inverter 15 as well as to the AND gate 83.

By adopting such a configuration, it becomes possible to set the grouping write mode and the single write mode by a software, that is, in execution of a a program by the CPU 50.

Next, explanation will be made on a fourth embodiment of the present invention.

Figure 10:
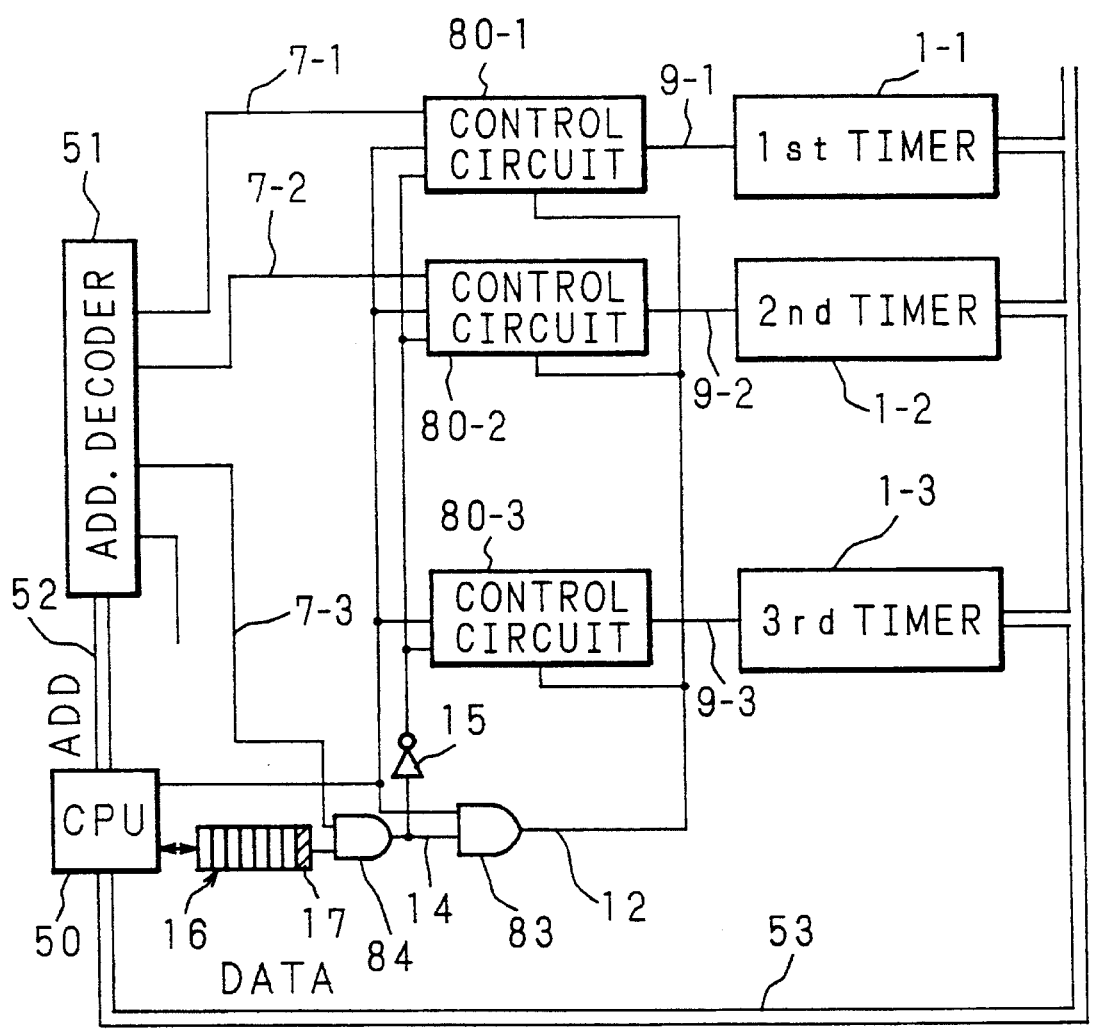
FIG. 10 is a block diagram showing a configuration of a timer apparatus of a fourth embodiment of the present invention.

FIG. 10 is a block diagram which shows the configuration of a fourth embodiment of the timer apparatus of the present invention, and reference symbols identical with those in the aforementioned FIG. 5, FIG. 9 and the like indicate identical or corresponding parts.

In the fourth embodiment shown in FIG. 10, the configuration is such that a grouping write mode is specified by an address which is allocated to the timer 1-3 among the addresses ADD outputted from the CPU 50.

Concretely, the "i"th timer register address decoding signals 7-1, 7-2 and 7-3 are outputted from the address decoder 51, and among them, an address for specifying, for example, the third timer 1-3 serves as an address for specifying the grouping write mode.

The third timer register address decoding signal 7-3 outputted from the address decoder 51 is then supplied to one of the inputs of the dual-input AND gate 84. The timer grouping bit 17 of the timer grouping register 16 is connected to the other input of the AND gate 84, and when both inputs are "1", the output of the AND gate 84 becomes "1". The output of the AND gate 84 is outputted as a timer grouping signal 14 to the inverter 15 as well as to the AND gate 83.

Consequently, since the third timer register address decoding signal 7-3 becomes "1" when the CPU 50 outputs the address for specifying the third timer 1-3, the timer grouping signal 14, which is the output of the AND gate 84, also becomes "1", and the grouping write mode is accomplished.

By adopting such a configuration, likewise as with the above-mentioned third embodiment, it becomes possible to set the grouping write mode and the single write mode by a software, that is, in execution of a program by the CPU 50. In the present fourth embodiment, however, the single write mode for specifying one of the plurality of timers, for example, the third timer 1-3 in abovementioned example cannot be executed. This is compensated by its effectiveness when there is not sufficiency for allocation of addresses and in similar cases, since one of the addresses previously allocated to the plurality of timers 1-1, 1-2 and 1-3 is used.

Figure 11:
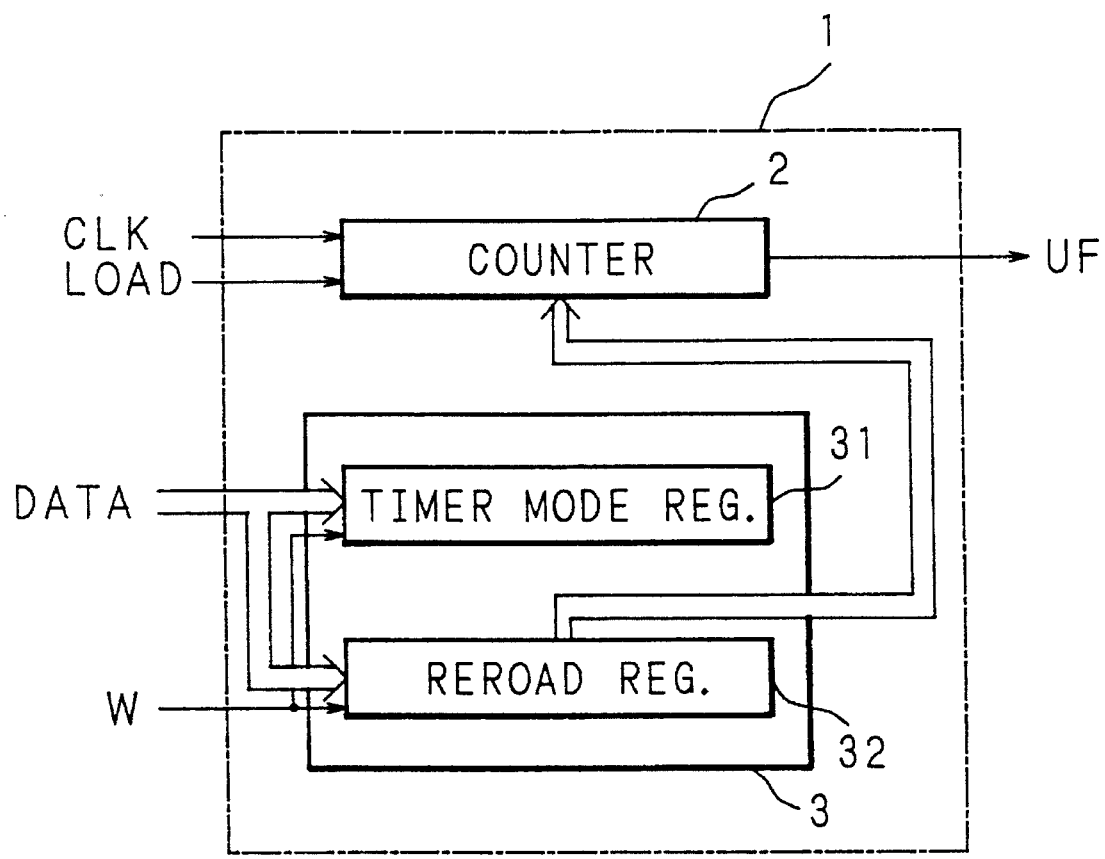
FIG. 11 is a block diagram showing a configuration of a register of a timer.

Now ordinarily, as shown in FIG. 11, a timer mode register 31 and a reload register 32 are provided as the registers 3 of each of the timers 1-1, 1-2 and 1-3.

The timer mode register 31 is a register for setting a function of the timer 1, and it realizes functions executed in accordance with data DATA written through the data bus 53 from the CPU 50.

The reload register 32 is, in turn, a register for setting the count frequency of the counter 2, and holds a value in response to data DATA written through the data bus 53 from the CPU 50. Then, when a load signal LOAD is supplied to the counter 2, the value held in the reload register 32 is loaded in the counter 2, and with this value as its initial value, and with the clock signal CLOCK as a count source, for example, the counter 2 starts counting down.

In such a way, after the counter 2 starts counting operation, when the counter 2 underflows and it has outputted an underflow signal UF, according to the data stored in the above-mentioned timer mode register 31, a function, for example, of discontinuing at that time point the counting operation of the counter 2, or of continuing a counting operation by reloading for the second time the value held in the reload register 32 into the counter, or the like function, is selected.

When the present invention is applied to a timer 1 provided, such as is shown in FIG. 11, with the timer mode register 31 and the reload register 32, needless to say, it is also suitable as a configuration applicable only to one of them although in FIG. 11 a configuration is shown in which the present invention is applicable to both the timer mode register 31 and to the reload register 32.

Next, explanation will be made on a fifth embodiment of the present invention.

Figure 12:
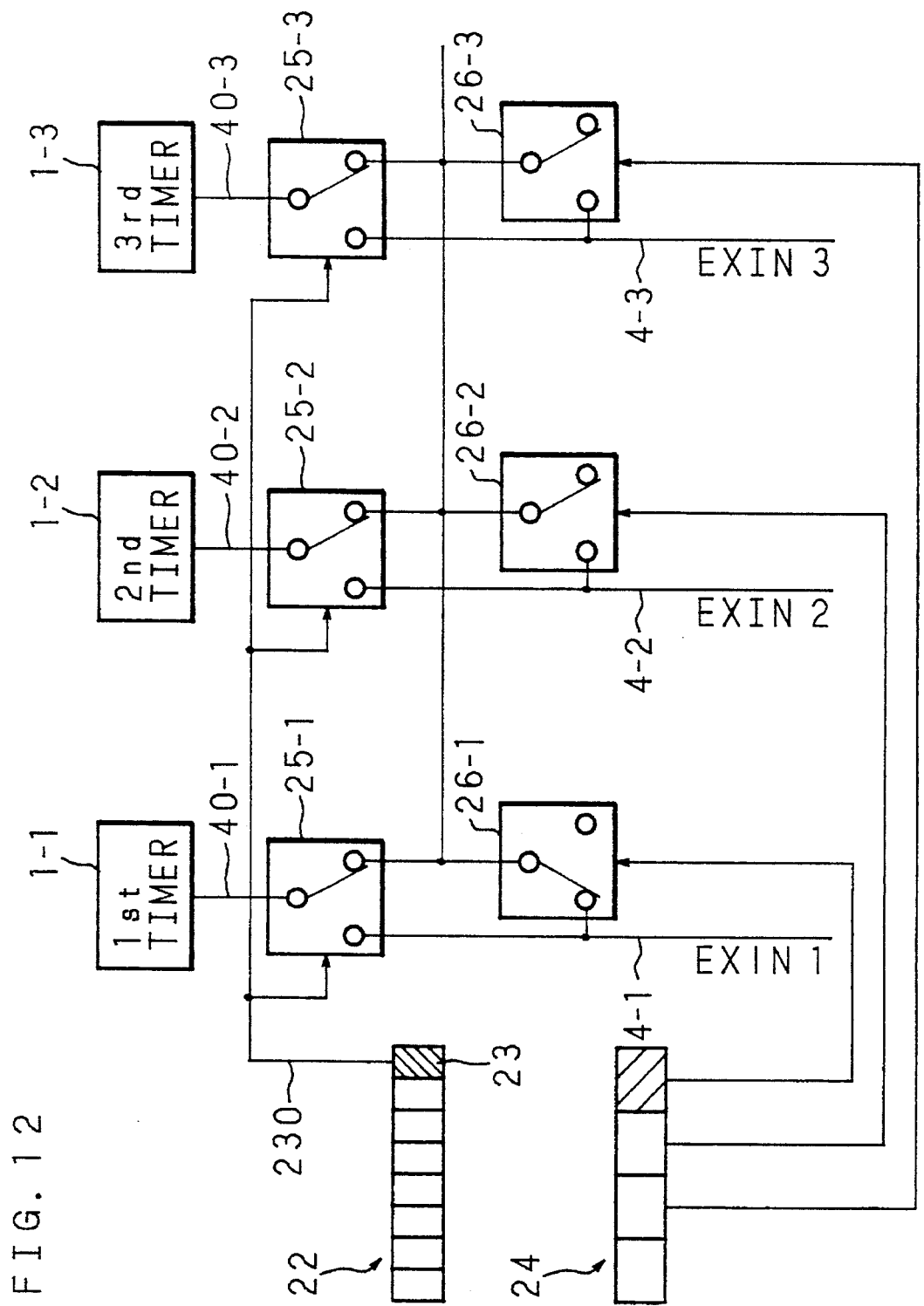
FIG. 12 is a block diagram showing an example of a configuration of a fifth embodiment of a timer apparatus of the present invention.

The fifth embodiment relates to an operation for selecting an external input signal EXIN, and the block diagram of FIG. 12 shows a configuration example thereof.

In FIG. 12, reference symbol 22 indicates an external input signal grouping register, and when data "1" is set in the specific one bit (called an external input signal grouping bit below) 23 data "1" is set, it becomes possible to control all of the other timers with the external input signal EXIN of one timer among the plurality of timers 1-1, 1-2 and 1-3.

The respective timers 1-1, 1-2 and 1-3 are provided with switching means 25-1, 25-2 and 25-3 respectively as controlling means which output respective signals 40-1, 40-2 and 40-3 as outputs. Each switching means 25-1, 25-2 and 25-3 is controlled according to an external input grouping signal 230, which is the signal having a value of the above-mentioned external input signal grouping bit 23.

The respective switching means 25-1, 25-2 and 25-3 are in turn connected with switching means 26-1, 26-2 and 26-3 as respectively corresponding selecting means. The outputs from the respective switching means 26-1, 26-2 and 26-3, and signals 4-1, 4-2 and 4-3 of respective external inputs EXIN 1, EXIN 2 and EXIN 3, are inputted to the respective switching means 25-1, 25-2 and 25-3. Now, the respective switching means 25-1, 25-2 and 25-3 are controlled such that when the external input signal grouping signal 230 is "1", they select the outputs of the switching means 26-1, 26-2 and 26-3, (i.e. in FIG. 12, the external input EXIN 1) and connect with 40-1, 40-2 and 40-3, respectively, which are the respective outputs, and moreover such that when the external input signal grouping signal 230 is "0", they connect the external inputs EXIN 1, EXIN 2 and EXIN 3 with 40-1, 40-2 and 40-3, which are the respective outputs.

Further, the respective switching means 26-1, 26-2 and 26-3 are controlled according to the values of the respective bits in an external input signal select register 24 whether the signals 4-1, 4-2 and 4-3, respectively, of the respective external input EXIN 1, EXIN 2 and EXIN 3 are connected or not.

The controlling function of the external input signal select register 24 is such that when the value of any of the bits corresponding to each switching means 26-1, 26-2 and 26-3, in other words, each timer 1-1, 1-2 and 1-3, is "1", the external input signal 4-1 (or 4-2, 4-3) to that timer 1-1 (or 1-2, 1-3) becomes the external input signal EXIN 1 (or EXIN 2, EXIN 3) to each of the remaining timers 1-2, 1-3, (or either 1-1 and 1-3, or 1-1 and 1-2).

Therefore, in the case where "1" is set in the external input signal grouping bit 23 of the external input signal grouping register 22 when "1" is set in any bit of the external input signal select registers 24, whichever of the signals 4-1, 4-2 and 4-3 of the external inputs EXIN 1, EXIN 2 and EXIN 3 corresponds to the timer 1-1, 1-2 and 1-3, respectively, in which "1" is set is inputted as the signals 40-1, 40-2 and 40-3 to all the timers 1-1, 1-2 and 1-3 (in FIG. 12 the signal 4-1 corresponding to EXIN1).

Still more, it is of course possible that the external input signal select register 24 can also serve as the foregoing timer grouping register 16.

In the timer apparatus, of the present invention as explained above in detail, when it is necessary that identical data be held in the respective registers of a plurality of timers built in a microcomputer, the processing time for enabling the writing of identical data simultaneously into the respective registers of the plurality of timers is curtailed.

Furthermore, because the timer single write signal (second signal) and the timer grouping write signal (third signal) are connected by the transfer gates, along with reducing the number of transistors necessary for a circuit, minimizing the circuit area is also made practicable.

Moreover, the circuit wiring has been taken into consideration such that the timer grouping write signal (third signal) is inputted successively into the plurality of timers, maximizing suppression of fluctuations in electrical potential in the computer.

Further, because it is practicable that the timer grouping signal (third signal) be generated as an address different from the address which specifies each timer, application distinguishing the timer grouping write signal (third signal) from the timer single write signal (second signal) during preparation of programs is possible.

Furthermore, because it is also practicable that the timer grouping write signal (third signal) be generated as an address for one timer among the addresses which specify each timer, the present invention can be realized without exclusive-use registers.

Still more, as each timer register, the timer mode register for setting, at least, the timer functions, and the reload register for setting the count period of the counter, are provided, and because the configuration is such that data from the CPU is written into either one or both of them, it is possible both to specify identical functions in the plurality of timers, or also to set identical initial count values therein.

Still further, when input of the external input clock to each timer is practicable, it becomes possible to input to all of the timers the external input clock input to be given to one timer.

As this invention may be embodied in several forms without departing from the spirit of essential characteristics thereof, the present embodiment is therefore illustrative and not restrictive, since the scope of the invention is defined by the appended claims, and all changes that fall within meets and bounds of the claims, or equivalents of such meets and bounds thereof are therefore intended to be embraced by the claims.

What is claimed is:

1. A timer apparatus built in a microcomputer having a CPU and generating an internal clock signal comprising:

a plurality of timers each having a register for holding data supplied from the CPU and a counter for counting the internal clock signal, said counter receiving said data held in the register as an initial count value;

a plurality of control circuits, each provided corresponding to a respective timer for generating a control signal instructing the register of the respective timer to write and hold the data supplied from the CPU; and a selection circuit for generating an output signal to said plurality of control circuits, respective control circuit having a first signal input line for receiving a first signal generated by said CPU for specifying writing of data to the registers, a second signal input line for receiving a second signal generated by said CPU for specifying a certain one of said plurality of timers, and a third signal input line for receiving the output signal from said selection circuit, and said selection circuit having a first signal input line for receiving said first signal and a second signal input line for receiving a third signal specifying single writing mode or group writing mode, wherein when said first signal is generated and said third signal specifies single writing mode, the control circuit corresponding to the timer specified by said second signal generates the control signal instructing the register of the corresponding timer to write and hold the data supplied from the CPU, and when said first signal is generated and said third signal specifies group writing mode, the output signal of said selection circuit instructs each of said plurality of control circuits to generate the control signal instructing the register of the corresponding timer to write and hold the data supplied from the CPU.

2. The timer apparatus according to claim 1, wherein said microcomputer has a register capable of setting a designated value, and said third signal is generated when a specific bit of said register has a predetermined value.

3. The timer apparatus according to claim 1, wherein said selection circuit includes a first gate receiving said first and third signals and providing a first output, and each control circuit includes a second gate receiving said first and second signals and providing a second output, and a transfer gate means for generating said control signal in response to said first and second outputs, and said third signal.

4. The timer apparatus according to claim 3, wherein the output signal of said selection circuit which instructs each of said plurality of control circuits to generate the control signal instructing the register of the corresponding timer to write and hold the data supplied from the CPU is inputted successively into said plurality of timers.

5. The timer apparatus according to claim 1, wherein each of the plurality of timers is allocated an address, said microcomputer has a decoder for decoding an address signal, generated by said CPU, into said second signal; and said decoder generates said third signal when a result of decoding by said decoder is an address which is not an address allocated to any one of said plurality of timers.

6. The timer apparatus according to claim 1, wherein each of the plurality of timers is allocated an address, said microcomputer has a decoder for decoding an address signal, generated by said CPU, into said second signal; and said decoder generates said third signal when a result of decoding by said decoder is an address which is allocated to a predetermined one of said plurality of timers.

7. The timer apparatus according to claim 1, wherein each register of said plurality of timers is provided with at least a timer mode register for setting a function of said timer, and a reload register for setting a count period of said counter, and data is written into one of said timer mode register and reload register, or into both said timer mode register and reload register, from said CPU.

* * * * *